United States Patent
Kang et al.

(10) Patent No.: US 8,660,557 B2
(45) Date of Patent: Feb. 25, 2014

(54) SYSTEM AND METHOD FOR TRANSMITTING/RECEIVING NEIGHBOR BS INFORMATION IN A COMMUNICATION SYSTEM

(75) Inventors: Hyon-Goo Kang, Suwon-si (KR); In-Seok Hwang, Seoul (KR); Jin-Kwan Jung, Seoul (KR); Min-Hee Cho, Suwon-si (KR); Kwang-Sik Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 790 days.

(21) Appl. No.: 12/124,442

(22) Filed: May 21, 2008

(65) Prior Publication Data

US 2008/0291875 A1 Nov. 27, 2008

(30) Foreign Application Priority Data

May 21, 2007 (KR) ........................ 10-2007-0049412

(51) Int. Cl.
*H04W 36/00* (2009.01)
(52) U.S. Cl.
USPC ............................ 455/436; 455/438; 370/331
(58) Field of Classification Search
USPC ............................ 455/436–444; 370/331–334
See application file for complete search history.

(56) References Cited

U.S. PATENT DOCUMENTS

| | | |
|---|---|---|
| 2004/0092259 A1 | 5/2004 | Blanc et al. |
| 2005/0282562 A1 | 12/2005 | Lee et al. |
| 2006/0092872 A1* | 5/2006 | Lee et al. ...................... 370/328 |
| 2007/0086387 A1* | 4/2007 | Kang et al. ..................... 370/331 |
| 2007/0105558 A1* | 5/2007 | Suh et al. ...................... 455/436 |
| 2007/0105592 A1 | 5/2007 | Kang et al. |
| 2007/0123292 A1 | 5/2007 | Kang et al. |

FOREIGN PATENT DOCUMENTS

| | | |
|---|---|---|
| KR | 1020070030622 | 3/2007 |
| KR | 1020070049911 | 5/2007 |

OTHER PUBLICATIONS

IEEE Standard for Local and Metropolitan Area Networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1, Feb. 28, 2006.

TTA Standard, Specifications for 2.3 GHz Band Portable Internet (WIBRO) Service—Physical & Medium Access Control Layer, Dec. 21, 2005.

* cited by examiner

*Primary Examiner* — Ajit Patel
(74) *Attorney, Agent, or Firm* — The Farrell Law Firm, P.C.

(57) ABSTRACT

In a communication system, a base station transmits a message including neighbor base station information to a mobile station, wherein neighbor base stations in the base station include m first type neighbor base stations and n second type neighbor base stations, the message includes an identifier dedicatedly allocated to the mobile station when the mobile station can get a service from one of the n second type neighbor base stations, the first type is different from the second type, the neighbor base station information includes information on the n second type neighbor base stations, and each of m and n is an integer identical to or greater than 1.

32 Claims, 2 Drawing Sheets

SYSTEM AND METHOD FOR TRANSMITTING/RECEIVING NEIGHBOR BS INFORMATION IN A COMMUNICATION SYSTEM

PRIORITY

This application claims priority under 35 U.S.C. §119(a) to an application filed in the Korean Intellectual Property Office on May 21, 2007 and assigned Serial No. 2007-49412, the contents of which are hereby incorporated by reference.

BACKGROUND OF THE INVENTION

1. Field of the Invention

The present invention generally relates to a communication system, and more particularly to a system and a method for transmitting/receiving neighbor Base Station (BS) information in a communication system.

2. Description of the Related Art

In the next generation communication systems, active research is taking place in order to provide users with high-speed services having various Qualities of Service (QoSs). Especially, in a Broadband Wireless Access (BWA) communication system, which is one of the next generation communication systems, active research is being conducted in order to support a high speed service capable of guaranteeing mobility and QoS. Representatives of such communication systems include an Institute of Electrical and Electronics Engineers (IEEE) 802.16e communication system.

An IEEE 802.16e communication system, which is one of the BWA communication systems, considers not only immobility of a subscriber station but also a mobility of the subscriber station. Therefore, when a Mobile Station (MS) having both immobility and mobility characteristics moves between multiple cells in the IEEE 802.16e communication system, the IEEE 802.16e communication system can guarantee the mobility of the MS by supporting handover of the MS.

In an IEEE 802.16e communication system, in order to support handover of an MS, a Base Station (BS) transmits information of each neighbor BS controlling a neighbor cell, which neighbors the cell (i.e. serving cell) controlled by itself, to all MSs within the serving cell. Specifically, the BS periodically broadcasts a mobile neighbor advertisement (MOB_NBR-ADV) message including information of neighbor BSs, thereby previously reporting state information of the neighbor cells to corresponding MSs. That is, when an MS located within one cell moves to a neighbor cell, the MS previously receives a MOB_NBR-ADV message broadcast by a BS (serving BS) controlling the cell in which the MS itself is located. As a result, the MS can perform handover after previously acquiring information (e.g. network identifier (ID), channel characteristics, etc.) of the BS (neighbor BS) controlling the neighbor cell to which the MS will move.

As described above, an IEEE 802.16e communication system supports handover of an MS. However, in an IEEE 802.16e communication system, when an MS fails to receive a MOB_NBR-ADV message periodically broadcast by a serving BS, the MS may fail to perform normal handover.

Specifically, the neighbor BS information is periodically fragmented and broadcast with a Broadcast Connection Identifier (BCID) through the MOB_NBR-ADV message. At this time, the MS can perform normal handover only after receiving all fragments of the MOB_NBR-ADV message. Therefore, if the MS fails to receive all fragments of the MOB_NBR-ADV message due to the communication environment or system situation, it may be impossible for the MS to perform normal handover. Further, if the period of the MOB_NBR-ADV message has passed and the MS defers the handover until it receives all fragments of the MOB_NBR-ADV message, delay may occur and connection may be interrupted during the handover.

Meanwhile, since the MOB_NBR-ADV message is broadcast with a BCID as described above, data bursts having the BCID are encoded according to a most robust encoding scheme so all MSs within the cell can receive the data bursts. For example, data bursts having the BCID are encoded according to a Quadrature Phase Shift Keying (QPSK) ½ scheme, which is the most robust encoding scheme in the IEEE 802.16e system, and are broadcast according to a six time repetition technique. Therefore, the size of the MOB_NBR-ADV message broadcast within one frame is physically restricted. That is to say, the MOB_NBR-ADV message is configured to express a difference between physical or logical shapes of the serving BS and the neighbor BSs. Therefore, the larger the difference between the serving BS and the neighbor BSs, the larger the size of the MOB_NBR-ADV message, which causes a limit in configuration of the MOB_NBR-ADV message.

The MOB_NBR-ADV message may be fragmented into a maximum of 16 fragments, each of which may contain information on a maximum of 256 neighbor BSs. However, when the MOB_NBR-ADV message is encoded according to a most robust scheme as described above, each fragment of the MOB_NBR-ADV message can include information on less than 10 neighbor BSs, and it is thus impossible to broadcast information on all neighbor BSs to MSs within the serving cell.

Further, since the BCID is used in broadcasting the MOB_NBR-ADV message as described above, all MSs within the serving cell can acquire the information on all the BSs included in the MOB_NBR-ADV message. However, if the serving BS wants to send information on a particular neighbor BS to only a particular MS, such a job cannot be performed by the MOB_NBR-ADV message, which is a broadcast message. Further, since the MOB_NBR-ADV message is a broadcast message, a message authentication code for which cannot be used, an MS having received the MOB_NBR-ADV message cannot perform an authentication job with a BS having broadcast the MOB_NBR-ADV message. Further, the IEEE 802.16e system defines 114 downlink preamble indexes within the same frequency. When the MOB_NBR-ADV message is broadcast based on the BCID, the preamble index is unique in the MOB_NBR-ADV message. Therefore, neighbor BSs of a particular BS cannot reuse the downlink preamble index within the same frequency.

SUMMARY OF THE INVENTION

Accordingly, the present invention substantially solves the above-mentioned problems occurring in the prior art, and provides a system and a method for transmitting/receiving neighbor BS information in a communication system.

Also, the present invention provides a system and a method for transmitting/receiving a MOB_NBR-ADV message to a particular MS in a communication system.

Moreover, the present invention provides a system and a method for transmitting/receiving a MOB_NBR-ADV message including information on a particular neighbor BS to a particular MS by a serving BS in a communication system.

In accordance with an aspect of the present invention, there is provided a method for transmitting neighbor base station information by a base station in a communication system, the method including transmitting a message including the neighbor base station information to a mobile station, wherein neighbor base stations of the base station include m first type neighbor base stations and n second type neighbor base stations, the message includes an identifier dedicatedly allocated to the mobile station when the mobile station can get a service from one of the n second type neighbor base stations, the first type is different from the second type, the neighbor base station information includes information on the n second type neighbor base stations, and each of m and n is an integer identical to or greater than 1.

In accordance with another aspect of the present invention, there is provided a method for receiving neighbor base station information by a mobile station in a communication system, the method including receiving a message including the neighbor base station information from a base station, wherein neighbor base stations of the base station include m first type neighbor base stations and n second type neighbor base stations, the message includes an identifier dedicatedly allocated to the mobile station when the mobile station can get a service from one of the n second type neighbor base stations, the first type is different from the second type, and the neighbor base station information includes information on the n second type neighbor base stations, and each of m and n is an integer identical to or greater than 1.

In accordance with another aspect of the present invention, there is provided a system for transmitting neighbor base station information, the system including a base station for transmitting a message including the neighbor base station information to a mobile station, wherein neighbor base stations of the base station include m first type neighbor base stations and n second type neighbor base stations, the message includes an identifier dedicatedly allocated to the mobile station when the mobile station can get a service from one of the n second type neighbor base stations, the first type is different from the second type, the neighbor base station information includes information on the n second type neighbor base stations, and each of m and n is an integer identical to or greater than 1.

In accordance with another aspect of the present invention, there is provided a system for receiving neighbor base station information, the system including a mobile station for receiving a message including the neighbor base station information from a base station, wherein neighbor base stations of the base station include m first type neighbor base stations and n second type neighbor base stations, the message includes an identifier dedicatedly allocated to the mobile station when the mobile station can get a service from one of the n second type neighbor base stations, the first type is different from the second type, the neighbor base station information includes information on the n second type neighbor base stations, and each of m and n is an integer identical to or greater than 1.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
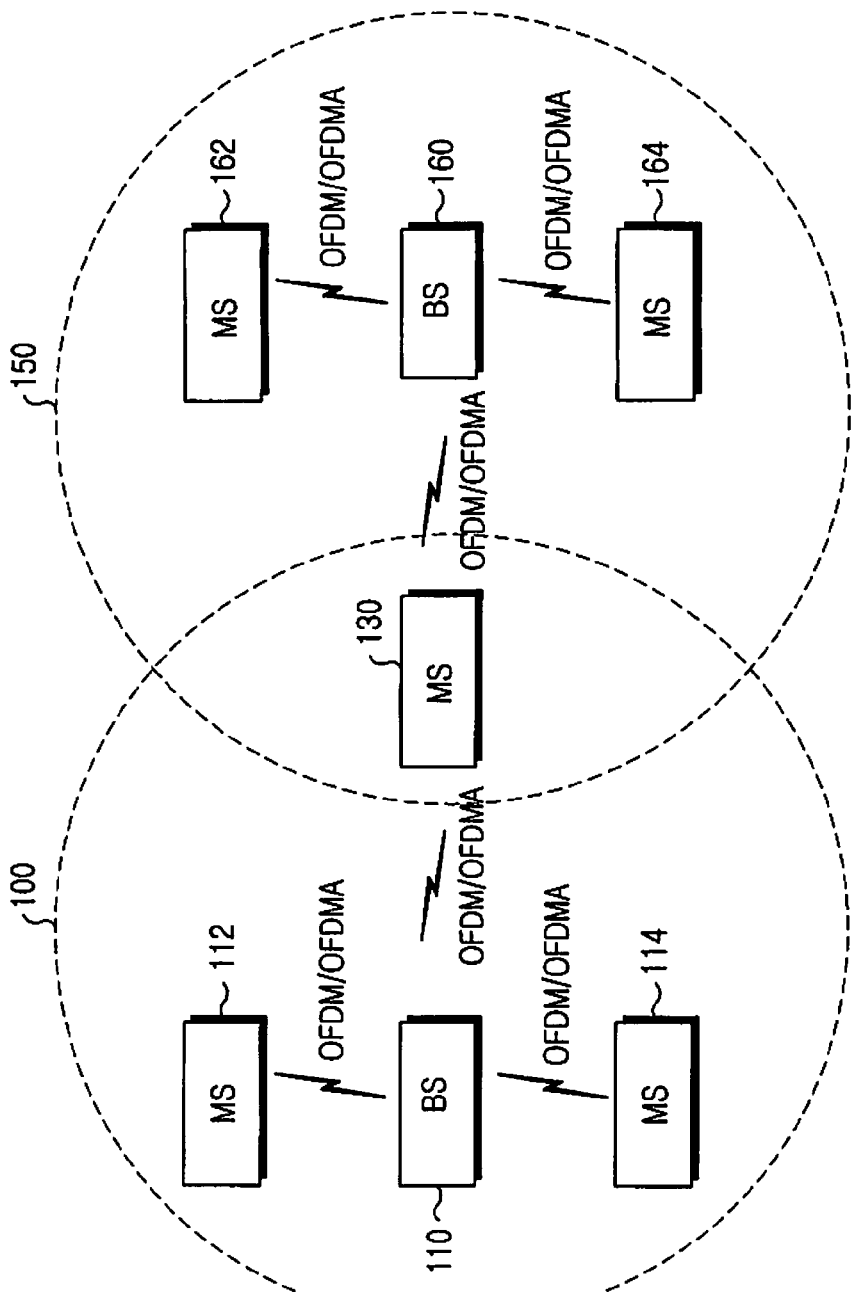
FIG. 1 is a block diagram illustrating a structure of an IEEE 802.16e communication system according to the present invention.

Hereinafter, preferred embodiments of the present invention will be described with reference to the accompanying drawings. In the following description, a description of known functions and configurations incorporated herein will be omitted when it may make the subject matter of the present invention rather unclear.

The following embodiments of the present invention discuss a method and system for transmitting/receiving neighbor Base Station (BS) information in an Institute of Electrical and Electronics Engineers (IEEE) 802.16 communication system, which a Broadband Wireless Access (BWA) communication system. The following descriptions of the present invention are based on an IEEE 802.16 communication system employing an Orthogonal Frequency Division Multiplexing (OFDM)/Orthogonal Frequency Division Multiple Access (OFDMA) scheme. However, the method and system for transmission/reception of neighbor BS information provided by the present invention can be applied to other communication systems, such as an Evolution IEEE 802.16 communication system.

Further, the following embodiments of the present invention discuss a method and a system for transmission/reception of neighbor BS information between a transmitter (e.g. BS) controlling a service area in a communication system and a receiver (e.g. a Mobile Station (MS) having both immobility and mobility characteristics) using a communication service provided by the transmitter. When the MS moves between multiple cells in the IEEE 802.16e communication system, the BS periodically broadcasts a mobile neighbor advertisement (MOB_NBR-ADV) message to all MSs within the cell (i.e. serving cell) controlled by the BS itself, in order to support handover of the MS. The MOB_NBR-ADV message includes information on neighbor BSs controlling all cells neighboring the serving cell. Accordingly, the IEEE 802.16e communication system can inform an MS of state information of neighbor cells in advance. That is to say, when an MS located within one cell moves to a neighbor cell, the MS can previously acquire information (e.g. network identifier (ID), channel characteristics, etc.) of the BS (neighbor BS) controlling the neighbor cell to which the MS will move, by receiving the MOB_NBR-ADV message broadcast by the serving BS controlling the cell in which the MS is currently located. Therefore, the IEEE 802.16e communication system can support handover of the MS.

According to the present invention, there exist m first type neighbor BSs and n second type neighbor BSs, where each of m and n is an integer identical to or greater than 1. Therefore, according to the type of the neighbor BSs, the serving BS transmits a MOB_NBR-ADV message to a particular MS among multiple MSs existing within the serving cell through a unicast scheme other than a broadcast scheme. Further, according to the present invention, when the serving BS transmits information on only particular type neighbor BSs from among all neighbor BSs to a particular MS, the serving BS transmits a MOB_NBR-ADV message including the information on the particular type neighbor BSs to the particular MS through a unicast scheme other than a broadcast scheme. The following descriptions of the present invention are based on an assumption that the first type neighbor BS is a public neighbor BS and the second type neighbor BS is a private neighbor BS. And the second type neighbor BS can be an access point operating a cell as one of a private cell, a home cell, and a micro cell. Furthermore the first type neighbor BS can be a macro neighbor BS and the second type neighbor BS can be a micro BS.

A structure of the IEEE 802.16e communication system according to the present invention will be described with reference to FIG. 1.

Referring to FIG. 1, the IEEE 802.16e communication system has a multi-cell structure including cell #1 100 and cell #2 150. Further, the IEEE 802.16e communication system includes BS #1 110 controlling cell #1 100, BS #2 160 controlling cell #2 150, and a plurality of MSs, which include MS #1 112, MS #2 114, MS #3 130, MS #4 162, and MS #5 164. Signal transmission/reception between the BSs 110 and 160 and the MSs 112, 114, 130, 162, and 164 is performed according to an OFDM/OFDMA scheme. From among the MSs 112, 114, 130, 162, and 164, MS #3 130 is located in a boundary area between cell #1 100 and cell #2 150, that is, in a handover area. Accordingly, if MS #3 130 moves to cell #2 150 controlled by BS #2 160 while it transmits/receives a signal to/from BS #1 110, the serving BS of MS #3 130 is changed from BS #1 110 to BS #2 160. A handover process in a communication system according to the present invention will be described with reference to FIG. 2.

Figure 2:
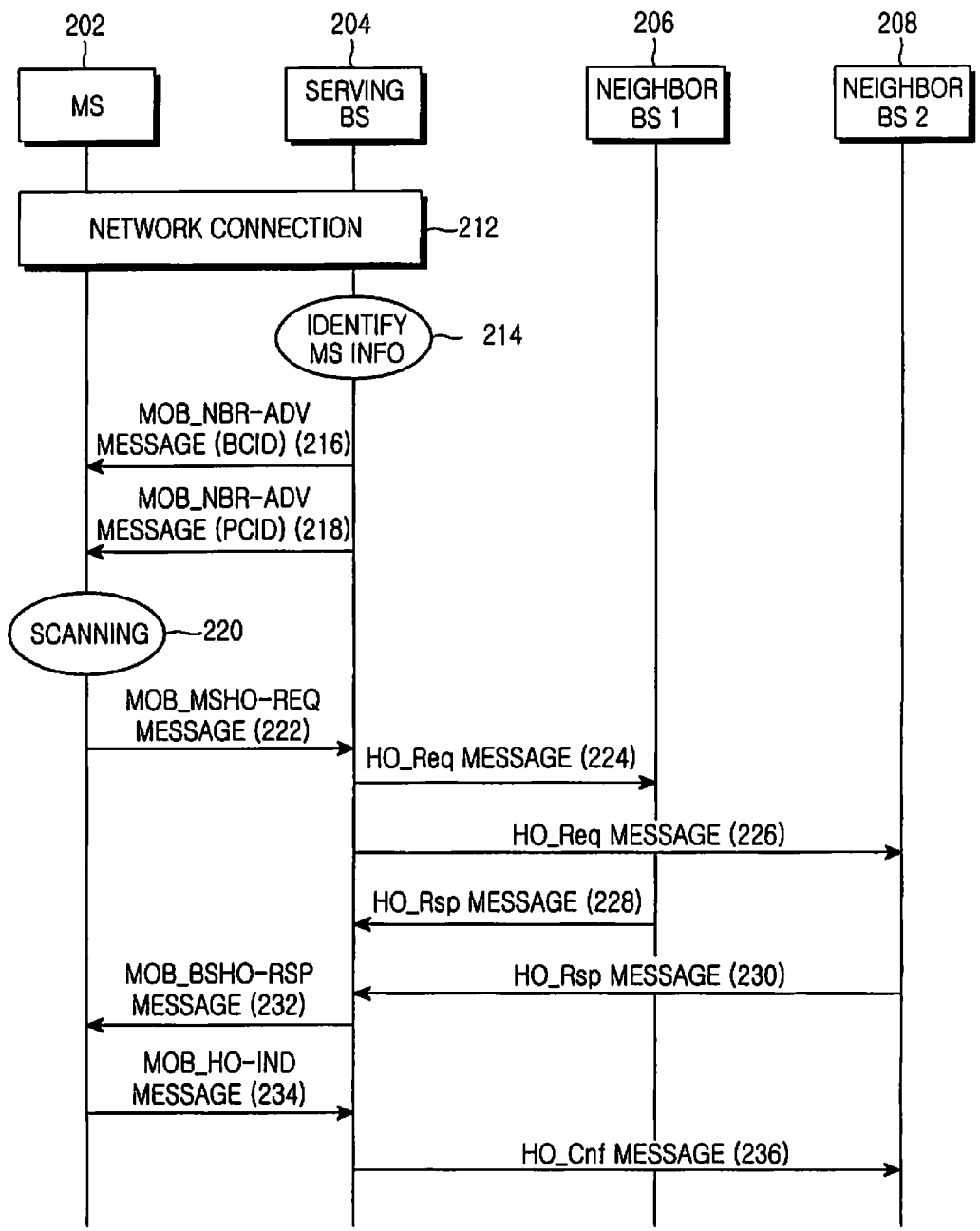
FIG. 2 is a signal flow diagram illustrating a handover process in a communication system according to the present invention.

FIG. 2 shows a handover process in a communication system according to the present invention.

According to the handover process shown in FIG. 2, the serving BS broadcasts an MOB_NBR-ADV message through use of a Broadcast Connection Identifier (BCID), and transmits the MOB_NBR-ADV message to a particular MS from among all MSs located within the serving cell according to a unicast scheme by using a Primary Connection Identifier (PCID). Here, one PCID is dedicatedly allocated to one MS. That is, PCIDs of each of MSs are different from one another.

Referring to FIG. 2, in the communication system, the MS 202 may make a success of initial network connection of the serving BS 204, handover from a neighbor BS, or re-connection to the serving BS 204 by receiving a paging signal from the serving BS 204. As noted from the above description, when an MS 202 located within the cell controlled by the serving BS 204 connects with the network of the serving BS 204 in step 212, the serving BS 204 identifies information of the connected MS 202 in step 214. Specifically, the serving BS 204 identifies information of communication environment and system environment (such as location information or channel information) of the MS 202 in order to determine if the MS 202 is an MS to which the serving BS 204 must transmit an MOB_NBR-ADV message according to a unicast scheme. The serving BS 204 is aware of an index list or IDs of private MSs for private neighbor BSs from among all the neighbor BSs of the serving BS 204. The present embodiment is based on an assumption that neighbor BS #2 208 is a private neighbor BS for the MS 202, in other words, the MS 202 can get a service from the neighbor BS #2 208 as the private neighbor BS. Accordingly, the serving BS 204 identifies that the MS 202 is a private MS for neighbor BS #2 208, which is a private neighbor BS. That is, the MS 202, which is a private MS, receives a private MOB_NBR-ADV message from the serving BS 204.

Thereafter, the serving BS 204 broadcasts an MOB_NBR-ADV message including information of all neighbor BSs to particular MSs 202 from among all MSs located within the cell controlled by the serving BS 204 in step 216. At this time, the MOB_NBR-ADV message is broadcast based on a BCID so all MSs connected with the serving BS 204, that is, all MSs located within the serving cell, can receive the MOB_NBR-ADV message. Further, the MOB_NBR-ADV message includes information on public neighbor BSs, which is broadcast to all MSs located within the serving cell, and can be fragmented into a maximum of 16 fragments. Therefore, the MS 202 acquires information of neighbor BSs by collecting all fragments of the MOB_NBR-ADV message.

Next, the serving BS 204 transmits a private MOB_NBR-ADV message to the MS 202, which is a particular private MS from among the MSs located within the serving cell, according to a unicast scheme by using a PCID in step 218. Therefore, even when the MS 202 fails to receive the MOB_NBR-ADV message transmitted from the serving BS 204 according to a broadcast scheme using a BCID in step 216, the MS 202 can receive the private MOB_NBR-ADV message transmitted according to the unicast scheme using the PCID in step 218. The private MOB_NBR-ADV message transmitted through a unicast scheme using the PCID in step 218 includes information on neighbor BS #2 208, which is a private neighbor BS, and may omit information on neighbor BS #1 206, which is one of public neighbor BSs other than the private neighbor BSs. The information of neighbor BSs included in the private MOB_NBR-ADV message transmitted according to the unicast scheme using the PCID in step 218 may be either information on a particular number of neighbor BSs from among all neighbor BSs controlling the neighbor cells neighboring the serving cell or information for identification of the MS 202 as described above in relation to step 214. Further, the information on the neighbor BSs may be either information on a particular number of neighbor BSs corresponding to the channel information or location information of the MS 202 or information on neighbor BSs to be scanned by the MS 202 from among the neighbor BSs.

Then, by using the acquired information of the neighbor BSs, the MS 202 measures the signal quality of reference signals (e.g. pilot signals) transmitted from neighbor BS #1 206 and neighbor BS #2 208 by scanning the Received Signal Strength Indicator (RSSI) or Carrier to Interference and Noise Ratio (CINR) of the signals in step 220. In order to measure the signal quality of pilot signals, the MS 202 scans the CINR or RSSI of the signals from the neighbor BSs 206 and 208. Then, if the MS 202 determines that handover is necessary, that is, it is necessary to handover from the current serving BS 204 to another BS, the MS 202 transmits a mobile MS handover request (MOB_MSHO-REQ) message to the serving BS 204 in step 222.

For the public neighbor BSs including neighbor BS #1 206, information of which the MS 202 has acquired from the MOB_NBR-ADV message broadcast based on the BCID in step 216, the MS 202 identifies the public neighbor BSs through the BS indexes in accordance with the order detected from the MOB_NBR-ADV message. Meanwhile, for the private neighbor BSs including neighbor BS #2 208, information of which the MS 202 has acquired from the MOB_NBR-ADV message transmitted according to a unicast scheme through the PCID in step 218, the MS 202 identifies the private neighbor BSs through full BS identifiers (BSIDs) regardless of the order detected from the MOB_NBR-ADV message.

Upon receiving the MOB_MSHO-REQ message, the serving BS 204 detects a recommended neighbor BS list including handoverable BSs for the MS 202 from Information Elements (IEs) included in the MOB_MSHO-REQ message. The recommended neighbor BS list includes information on neighbor BSs to which the MS 202 is recommended to handover. The present embodiment is based on an assumption that the recommended neighbor BS list includes neighbor BS #1 206 and neighbor BS #2 208.

Then, the serving BS 204 transmits a handover request (HO_Req) message to the recommended neighbor BSs included in the recommended neighbor BS list, that is, to neighbor BS #1 206 and neighbor BS #2 208 in steps 224 and 226. The HO_Req message includes information on the Quality of Service (QoS) and bandwidth to be provided to the MS 202 by a new serving BS (target BS) of the MS 202. In response to the HO_Req message, neighbor BS #1 206 and neighbor BS #2 208 transmit a handover response message (HO_Rsp) message to the serving BS 204, respectively in step 228 and 230. The HO_Rsp message includes QoS information supportable by the neighbor BSs 206 and 208 from among the QoSs used by the MS 202.

Upon receiving the HO_Rsp message from neighbor BS #1 206 and neighbor BS #2 208, the serving BS 204 transmits a mobile BS handover response (MOB_BSHO-RSP) message including the information (e.g. QoS information) of the neighbor BSs 206 and 208 acquired from the HO_Rsp message to the MS 202 in step 232.

Upon receiving the MOB_BSHO-RSP message, the MS 202 determines the final target BS capable of providing the QoS and bandwidth required by the MS 202 from among the neighbor BSs 206 and 208. According to the present embodiment, it is assumed that the MS 202 determines neighbor BS #2 206, which is a private neighbor BS, as the final target BS. After determining neighbor BS #2 206 as the final target BS, to which the MS 202 will handover, the MS 202 transmits a mobile handover indication (MOB_HO-IND) message to the serving BS 204 as a response message to the MOB_BSHO-RSP message in step 234. Upon receiving the MOB_HO-IND message, the serving BS 204 transmits a handover confirmation (HO_Cnf) message 236 to neighbor BS #2 208, which is the target BS included in the MOB_HO-IND message in step 236. Then, neighbor BS #2 208, which is the target BS, prepares handover based on the received HO_Cnf message.

The MOB_NBR-ADV message transmitted from the serving BS to the MS located within the serving cell in a communication system according to the present invention will be described with reference to Table 1.

Table 1 below shows a structure of the MOB_NBR-ADV message transmitted in a communication system according to the present invention.

TABLE 1

| Syntax | Size | Notes |
| --- | --- | --- |
| Header Type | 1 bit | Shall be set to zero<br>/* 0 = Generic MAC Header<br>1 = Bandwidth Request Header */ |
| Encryption Control | 1 bit | Shall be set to zero<br>/* 0 = Payload is not encrypted or payload is not included<br>1 = Payload is encrypted */ |
| Type | 6 bits | This field indicates the subheaders and special payload types present in the message payload |
| ESF (Extended Subheader Field) | 1 bit | Extended subheader field |
| CRC Indicator | 1 bit | 0 = No CRC is appended<br>1 = CRC is appended to the Packet Data Unit (PDU) |
| Encryption Key Sequence | 2 bits | Shall be ignored |
| reserved | 1 bit | Shall be set to zero |
| Length | 11 bits | The length in bytes of the MAC PDU including the MAC header and the CRC if present. |
| CID | 16 bits | Broadcast CID = 0xFFFF<br>If this message is transmitted by the primary management connection, this field shall be primary CID of the MS. |
| Header Check Sequence | 8 bits | An 8-bit field used to detect errors in the header. |
| MOB_NBR-ADV_Message_format( ) { | — | — |
| Management Message Type = 53 | 8 bits | — |
| Skip-optional-fields bitmap | 8 bits | Bit [0]: if set to 1, omit Operator ID field.<br>Bit [1]: if set to 1, omit NBR BS ID field.<br>Bit [2]: if set to 1, omit HO process optimization field.<br>Bit [3]: if set to 1, omit QoS related fields.<br>Bit [4]-[6]: Reserved.<br>Bit [7]: if set to 1, this message is authenticated with the CMAC Tuple. When this message is transmitted by the broadcast management connection, it shall be set to zero. |
| If (skip-optional-fields [0] == 0) { | — | — |
|   Operator ID | 24 bits | Identifier of the network provider |
| } | — | — |
| Configuration Change Count | 8 bits | Incremented each time the information for the associated neighbor BS has changed.<br>If this message is transmitted by the primary management connection, this field shall be set to zero and ignored. |

TABLE 1-continued

| | | |
|---|---|---|
| Fragmentation Index | 4 bits | Indicate the current fragmentation index.<br>If this message is transmitted by the primary management connection, this field shall be set to zero and ignored. |
| HO Process Optimization | 8 bits | HO process Optimization is provided as part of this message is indicative only. HO process requirements may change at time of actual HO. For each Bit location, a value of '0' indicates the reentry management messages shall be required, a value of '1' indicates the reentry management message may be omitted. Regardless of the HO process optimization TLV settings, the target BS may send unsolicited SBC-RSP and/or REG-RSP management messages<br>Bit #0: Omit SBC-REQ/RSP management messages during re-entry processing<br>Bit #1: Omit RKM Authentication Phase except TEK phase during current re-entry processing<br>Bit #2: Omit RKM TEK creation phase during re-entry processing<br>Bit #3: Omit Network Address Acquisition management messages during current re-entry processing<br>Bit #4: Omit Time of Day Acquisition management messages during current re-entry processing<br>Bit #5: Omit TFTP management messages during current re-entry processing<br>Bit #6: Full service and operational state transfer or sharing between serving BS and target BS (All static and dynamic context, e.g. ARQ window contents, timers, counters, state machines)<br>Bit #7: Omit REG-REQ/RSP management during current re-entry processing. |
| } | — | — |
| If (skip-optional-fields [3] == 0) { | — | — |
| Scheduling Service Supported | 8 bits | Bitmap to indicate if BS supports a particular scheduling service. 1 indicates support, 0 indicates not support:<br>Bit #0: Unsolicited Grant Service (UGS)<br>Bit #1: Real-time Polling Service (rtPS)<br>Bit #2: Non-real-time Polling Service (nrtPS)<br>Bit #3: Best Effort<br>Bit #4: Extended real-time Polling Service (ertPS)<br>If the value of bit 0 through bit 4 is 0b00000, it indicates no information on service available.<br>Bit #5-7: Reserved; shall be set to zero. |
| } | — | — |
| DCD Configuration Change Count | 4 bits | This represents the 4 LSBs of the Neighbor BS current DCD configuration change count. |
| Total Fragmentation | 4 bits | Indicates the total number of fragmentations.<br>If this message is transmitted by the primary management connection, this field shall be set to zero and ignored. |
| N_NEIGHBORS | 8 bits | |
| For (j=0; j<N_NEIGHBORS; j++)<br>( | — | — |
| Length | 8 bits | Length of message information including all fields within the FOR LOOP. |
| PHY Profile ID | 8 bits | Aggregated IDs of Co-located FA Indicator, FA Configuration Indicator, FFT size, Bandwidth, Operation |

TABLE 1-continued

| | | | |
|---|---|---|---|
| | | | Mode of the starting subchannelization of a frame, and Channel Number. |
| If (FA Index Indicator == 1) {  FA Index | | 8 bits | This field, Frequency Assignment Index, is present only the FA Index Indicator in PHY Profile ID is set. Otherwise, the neighbor BS has the same FA Index or the center frequency is indicated using the TLV encoded information. |
| } If (BS EIRP Indicator == 1) { BS EIRP | | 8 bits | Signed Integer from 128 to 127 in unit of dBm This field is present only if the BS EIRP indicator is set in PHY Profile ID. Otherwise, the BS has the same EIRP as the serving BS. |
| } If (Skip-optional-fields[1] == 0) { Neighbor BSID | | 24 bits | This is an optional field for OFDMA PHY and it is omitted or skipped if Skip optional fields Flag = 1. |
| } Preamble Index/Subchannel Index | | 8 bits | For the SCa and OFDMA PHY this parameter defines the PHY specific preamble. For the OFDM PHY, the 5 LSB contain the active DL subchannel index and the 3 MSB shall be Reserved and set to '0b000'. For the OFDMA PHY, bit 7 is used to indicate the reuse factor of the neighbor for purpose of CINR measurement for handoff. A value of '0' indicates a reuse factor of 1 and a value of '1' indicates reuse factor of 3. |
| If (Skip-optional-fields[2] == 0) { UCD Configuration Change Count | | 4 bits | This represents the 4 LSBs of the Neighbor BS current UCD configuration change count. |
| TLV Encoded Neighbor Information | | Var | TLV Specific |

| Syntax | Type | Length | |
|---|---|---|---|
| PHY Mode ID | 22 | 2 Bytes | Set to 0 for Sca. Refer to Table 384a and Table 384b for the PHY Mode ID fields description of the other PHYs. |
| DCD_settings | 1 | var | See Table 384c |
| UCD_settings | 2 | var | See Table 384c |
| Neighbor BS trigger } | 4 | var | See Table 384c |
| If (Skip-optional-fields[7] == 1) { CMAC Tuple | 141 | 13 or 19 Bytes | See Table 348b |
| } } | | | |

Referring to Table 1, header fields of the MOB_NBR-ADV message include a Header Type field indicating the header type of the MOB_NBR-ADV message, an Encryption Control field indicating encryption control of the MOB_NBR-ADV message, a Type field indicating a sub-header of the MOB_NBR-ADV message header, an Extended Subheader Field (ESF) indicating extension of the sub-header field, a CRC Indicator field indicating if a Cyclic Redundancy Check (CRC) code is added or not, an Encryption Key Sequence field indicating an encryption key sequence, a Length field indicating the length of the header, a CID field indicating the MOB_NBR-ADV message transmitting scheme, that is, indicating if the message is a MOB_NBR-ADV message broadcast through a BCID or a MOB_NBR-ADV message transmitted to a particular MS (i.e. private MS) according to a unicast scheme through a PCID, and a Header Check Sequence field indicating the header check sequence.

Further, message fields of the MOB_NBR-ADV message include a Management Message Type field indicating the message type of the MOB_NBR-ADV message, a Skip-optional-fields bitmap field indicating skip fields of the MOB_NBR-ADV message fields, an Operator ID field indicating an identifier of an operator to be shared by a series of BSs, a Configuration Change Count field indicating a change counter for configuration of the MOB_NBR-ADV message, a Fragmentation Index field indicating an index of a fragment of the MOB_NBR-ADV message transmitted through the current frame, a Total Fragmentation field indicating the number of fragments of the MOB_NBR-ADV message, and an N_NEIGHBORS indicating the number of neighbor BSs included in the MOB_NBR-ADV message.

In addition, the MOB_NBR-ADV message includes a Length field indicating the length of the MOB_NBR-ADV message including the neighbor BS information, a physical profile identifier (PHY Profile ID) field that indicates physical information of a BS and contains information of the Co-located Frequency Assignment (FA) Indicator bit, the FA Configuration indicator bit, the Time/Frequency Synchronization Indicator, the BS EIRP Indicator, the DCD/UCD Reference Indicator, the FA Index Indicator, and the FA number, an FA Index field indicating an FA index in the PHY Profile ID field set, a BS Effective Isotropic Radiated Power (EIRP) field indicating a BS EIRP Indicator in the PHY Profile ID field set, a Neighbor BSID field indicating an identifier (ID) of a neighbor BS, a Preamble Index/Subchannel Index field indicating preamble and sub-channel indexes, an HO Process Optimization field indicating an optimum handover process, a Scheduling Service Supported field indicating a service support scheduling, a Downlink Channel Descript (DCD) Configuration Change Count field indicating a change count for DCD configuration, a Uplink Channel Descript (UCD) Configuration Change Count field indicating a change count for UCD configuration, a PHY Mode ID TLV (Type, Length, Value) field indicating a physical mode identifier, a DCD_settings TLV field indicating DCD setting, a UCD_settings TLV field indicating UCD setting, a Neighbor BS trigger TLV field indicating trigger of a neighbor BS, and a Cipher-based Message Authentication Code (CMAC) Tuple TLV field. Each of the TLV fields corresponds to a variable field that may be determined to be either included or excluded according to the object of using the field.

As described above, in the MOB_NBR-ADV message, which is transmitted to a particular MS (private MS) from among all MSs located within the serving cell by the serving BS according to a unicast scheme using a PCID, the Configuration Change Count field, the Fragmentation Index field, and the Fragmentation field are set to "0" and ignored. Further, when the MOB_NBR-ADV message is transmitted using the PCID, the MOB_NBR-ADV message may be transmitted after being fragmented through the Fragmentation Sub-header or the Packing Sub-header. At this time, the fragmentation related fields of the MOB_NBR-ADV message are not used. Further, when the serving BS transmits the MOB_NBR-ADV message to the private MS according to a unicast scheme through the PCID, the seventh bit of the Skip-optional-fields bitmap field can indicate the existence or absence of the CMAC Tuple necessary for authentication of the MOB_NBR-ADV message. That is, when the seventh bit of the Skip-optional-fields bitmap field is set to "1," the MOB_NBR-ADV message is authenticated through the CMAC Tuple. When it fails in the authentication, it is skipped.

In a communication system according to an embodiment of the present invention, the serving BS first identifies MSs located within the serving cell, that is, MSs connected with the serving BS itself. Then, if there exists an MS (i.e. private MS) requiring reception of an MOB_NBR-ADV message according to a unicast scheme through a PCID, the serving BS configures an MOB_NBR-ADV message corresponding to the private MS and then transmits the configured MOB_NBR-ADV message to the private MS according to the unicast scheme through the PCID.

In a communication system according to the present invention, a serving BS can either broadcast a message including information of neighbor BSs to all MSs located within a serving cell or transmit the message to a particular MS from among all the MSs according to a unicast scheme. As a result, it is possible to provide information of neighbor BSs to all the MSs within the serving cell, thereby supporting normal handover of the MS. Further, through the unicast message transmission, the present invention can employ an efficient encoding scheme, which achieves efficient use of resources and improve the system performance. Further, the present invention can authenticate a message by using a message authentication code matching the object of using the message.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting neighbor base station information by a base station in a communication system, the method comprising:
classifying a plurality of neighbor base stations into a first group of base stations and a second group of base stations;
identifying a first group of mobile stations from a plurality of mobile stations, first group of mobile stations being able to perform communication with at least one base station included in the first group of base stations;
transmitting a broadcast message, including information on at least one base station included in the second group of base stations, to the plurality of mobile stations; and
transmitting a unicast message, including information on the at least one base station included in the first group of base stations, to at least one mobile station included in the first group of mobile stations.

2. The method of claim 1, wherein identifying the first group of mobile stations comprises identifying the first group of mobile stations based on an identifier list for mobile stations being able to perform communication with the at least one base station included in the first group of base stations.

3. The method of claim 1, wherein the broadcast message is periodically transmitted by using a Broadcast Connection Identifier (BCID).

4. The method of claim 1, wherein the unicast message is unicasted by using a Primary Connection Identifier (PCID) allocated to the at least one mobile station included in the first group of mobile stations.

5. The method of claim 1, wherein each of the broadcast and unicast messages includes authentication information used for authentication of each of the broadcast and unicast messages, and the authentication information includes a Cipher-based Message Authentication Code (CMAC).

6. The method of claim 1, wherein the broadcast message includes a first field indicating an identifier commonly allocated to the plurality of mobile stations, a second field indicating a number of fragments fragmented from information on the at least one base station included in the second group of base stations, and a third field indicating an index for a corresponding fragment of the fragments.

7. The method of claim 6, wherein the unicast message includes the second field and the third field, and field values of the second field and the third field are ignored by the at least one mobile station included in the first group of mobile stations.

8. The method of claim 1, wherein the first group of base stations includes private neighbor base stations, and the second group of base stations includes public neighbor base stations.

9. A method for receiving neighbor base station information by a mobile station in a communication system, the method comprising:
receiving a broadcast message, including information on at least one base station included in a second group of base stations, from a serving base station, a plurality of neighbor base stations of the serving base station being classified into a first group of base stations and the second group of base stations; and receiving a unicast message, including information on at least one base station included in the first group of base stations, from the serving base station, the mobile station being able to perform communication with at least one base station included in the first group of base stations.

10. The method of claim 9, wherein the mobile station is identified by the serving base station based on an identifier list for mobile stations being able to perform communication with the at least one base station included in the first group of base stations.

11. The method of claim 9, wherein the broadcast message is periodically transmitted by using a Broadcast Connection Identifier (BCID).

12. The method of claim 9, wherein the unicast message is unicasted by using a Primary Connection Identifier (PCID) allocated to the at least one mobile station included in the first group of mobile stations.

13. The method of claim 9, wherein each of the broadcast and unicast messages includes authentication information used for authentication of each of the broadcast and unicast messages, and the authentication information includes a Cipher-based Message Authentication Code (CMAC).

14. The method of claim 9, wherein the broadcast message includes a first field indicating an identifier commonly allocated to the plurality of mobile stations, a second field indicating a number of fragments fragmented from information on the at least one base station included in the second group of base stations, and a third field indicating an index for a corresponding fragment of the fragments.

15. The method of claim 14, wherein the unicast message includes the second field and the third field, and field values of the second field and the third field are ignored by the at least one mobile station included in the first group of mobile stations.

16. The method of claim 9, wherein the first group of base stations includes private neighbor base stations, and the second group of base stations includes public neighbor base stations.

17. A base station in a communication system, the base station comprising:

a controller for classifying a plurality of neighbor base stations into a first group of base stations and a second group of base stations, and identifying a first group of mobile stations from a plurality of mobile stations, the first group of mobile stations being able to perform communication with at least -one base station included in the first group of base stations; and a transmitter for transmitting a broadcast message, including information on at least one base station included in the second group of base stations, to the plurality of mobile stations; and transmitting a unicast message, including information on the at least one base station included in the first group of base stations, to at least one mobile station included in the first group of mobile stations.

18. The base station of claim 17, wherein the controller identifies the first group of mobile stations based on an identifier list for mobile stations being able to perform communication with the at least one base station included in the first group of base stations.

19. The base station of claim 17, wherein the broadcast message is periodically transmitted by using a Broadcast Connection Identifier (BCID).

20. The base station of claim 17, wherein the unicast message is unicasted by using a Primary Connection Identifier (PCID) allocated to the at least one mobile station included in the first group of mobile stations.

21. The base station of claim 17, wherein each of the broadcast and unicast messages includes authentication information used for authentication of each of the broadcast and unicast messages, and the authentication information includes a Cipher-based Message Authentication Code (CMAC).

22. The base station of claim 17, wherein the broadcast message includes a first field indicating an identifier commonly allocated to the plurality of mobile stations, a second field indicating a number of fragments fragmented from information on the at least one base station included in the second group of base stations, and a third field indicating an index for a corresponding fragment of the fragments.

23. The base station of claim 22, wherein the unicast message includes the second field and the third field, and field values of the second field and the third field are ignored by the at least one mobile station included in the first group of mobile stations.

24. The base station of claim 17, wherein the first group of base stations includes private neighbor base stations, and the second group of base stations includes public neighbor base stations.

25. A mobile station in a communication system, the mobile station comprising:

a receiver for receiving a broadcast message, including information on at least one base station included in a second group of base stations, from a serving base station, a plurality of neighbor base stations of the serving base station being classified into a first group of base stations and the second group of base stations, and for receiving a unicast message, including information on at least one base station included in the first group of base stations, from the serving base station, the mobile station being able to perform communication with at least one base station included in the first group of base stations.

26. The mobile station of claim 25, wherein the mobile station is identified by the serving base station based on an identifier list for mobile stations being able to perform communication with the at least one base station included in the first group of base stations.

27. The mobile station of claim 25, wherein the broadcast message is periodically transmitted by using a Broadcast Connection Identifier (BCID).

28. The mobile station of claim 25, wherein the unicast message is unicasted by using a Primary Connection Identifier (PCID) allocated to the at least one mobile station included in the first group of mobile stations.

29. The mobile station of claim 25, wherein each of the broadcast and unicast messages includes authentication information used for authentication of each of the broadcast and unicast messages, and the authentication information includes a Cipher-based Message Authentication Code (CMAC).

30. The mobile station of claim 25, wherein the broadcast message includes a first field indicating an identifier commonly allocated to the plurality of mobile stations, a second field indicating a number of fragments fragmented from information on the at least one base station included in the second group of base stations, and a third field indicating an index for a corresponding fragment of the fragments.

31. The mobile station of claim 30, wherein the unicast message includes the second field and the third field, and field values of the second field and the third field are ignored by the at least one mobile station included in the first group of mobile stations.

32. The mobile station of claim 25, wherein the first group of base stations includes private neighbor base stations, and the second group of base stations includes public neighbor base stations.

* * * * *